United States Patent
Wu et al.

(10) Patent No.: US 7,751,023 B2
(45) Date of Patent: Jul. 6, 2010

(54) APPARATUS FOR RUBBING ALIGNMENT LAYER ON A SUBSTRATE

(75) Inventors: Pin-Chun Wu, Tao Yuan Shien (TW); Chih-Chieh Chang, Tao Yuan Shien (TW); Chih-Hsiung Weng, Tao Yuan Shien (TW); Tsung-Yuan Chang, Tao Yuan Shien (TW)

(73) Assignee: Quanta Display Inc., Tao Yuan Shien (TW)

( * ) Notice: Subject to any disclaimer, the term of this patent is extended or adjusted under 35 U.S.C. 154(b) by 338 days.

(21) Appl. No.: 11/889,680

(22) Filed: Aug. 15, 2007

(65) Prior Publication Data

US 2008/0170191 A1    Jul. 17, 2008

(30) Foreign Application Priority Data

Jan. 11, 2007    (TW) ............................. 96101129 A

(51) Int. Cl.
*G02F 1/13* (2006.01)
*G02F 1/1337* (2006.01)
(52) U.S. Cl. ...................... 349/187; 349/126
(58) Field of Classification Search .................. 349/126, 349/187
See application file for complete search history.

(56) References Cited

U.S. PATENT DOCUMENTS

| 2003/0093172 A1* | 5/2003 | Lee ............................. 700/119 |
| 2004/0198182 A1 | 10/2004 | Kuan et al. |
| 2005/0157246 A1* | 7/2005 | Motomatsu ................. 349/187 |

FOREIGN PATENT DOCUMENTS

| JP | 5034694 A | 2/1993 |
| JP | 2003295189 | 10/2003 |
| JP | 2005266019 | 9/2005 |
| JP | 2005292430 A | 10/2005 |

* cited by examiner

*Primary Examiner*—David Nelms
*Assistant Examiner*—Nathanael R Briggs
(74) *Attorney, Agent, or Firm*—Bacon & Thomas, PLLC

(57) ABSTRACT

An apparatus for rubbing an alignment layer on a substrate is disclosed. The apparatus includes a platform to support the substrate; a conveyance unit incorporating the platform to convey the substrate in a predetermined direction; a rubbing roller located above the platform for rubbing the alignment layer on the substrate; a combing unit located at one side of the rubbing roller for contacting with the rubbing roller; and at least one vacuum suction unit located at one side of the platform to suck and remove the particles released from the rubbing. The combing unit serves to smoothen a rubbing cloth on the rubbing roller, with a result of low static electricity accumulation on the substrate and of a better alignment effect on the alignment layer.

12 Claims, 4 Drawing Sheets

APPARATUS FOR RUBBING ALIGNMENT LAYER ON A SUBSTRATE

BACKGROUND OF THE INVENTION

1. Field of the Invention

The present invention relates to an apparatus for rubbing a liquid crystal alignment layer, and particularly to an apparatus for rubbing a liquid crystal alignment layer so that particles released from an alignment layer rubbing process can be removed and that yield rate of liquid crystal display panels can be raised after the alignment layer rubbing process.

2. Description of Related Art

A process for manufacturing Thin Film Transistor-Liquid Crystal Displays (TFT-LCDs) can be divided into three procedures, namely: firstly, a process for manufacturing array substrates and color filters; secondly, a process for display panel assembly including alignment layer rubbing, liquid crystal filling, and sealing; and thirdly, a process for manufacturing liquid crystal modules including assembly of polarizing sheets, backlight sheets and display panels. With respect to the process for display panel assembly, a process for rubbing alignment layers takes a significant and critical role. The alignment layer rubbing process not only takes an important role in controlling the order and orientation of liquid crystal alignment layers, but also maintains the characteristics for a high-quality display including viewing angle, reaction speed, contrast, and color expression.

To align an alignment layer refers to orientation for liquid crystal molecules, with the purpose of making a unified and consistent orientation or an orientation arrangement for the liquid crystal molecules allover or at part of a liquid crystal display (LCD) panel. The purpose for aligning the alignment layer in an LCD is that, when the liquid crystal molecules are driven by an electric field, part of or all of the liquid crystal molecules require a synchronous and consistent action, so that display actions can be prompt and unified. To achieve such a purpose, the procedure of alignment becomes necessary.

Currently, flannelette rubbing rollers are mostly employed in an apparatus for rubbing alignment layers, such that a contacting mechanical rubbing may be applied to the substrates having alignment layers and that a regular pretilt angle may be produced for the alignment layers. Accordingly, the liquid crystal on the alignment layers is formed with a pretilt angle. Such a technique has been adopted for TFT-LCD manufacture until presently due to the merits, such as a shorter operation time. The operation can be performed under normal temperature; and superior characteristics on mass production. Nevertheless, the contacting mechanical rubbing bears shortcomings, for example: the material for making rubbing cloth polyimide has characteristics of high polarization and high absorbency, so that during storage or delivery, the material tends to deteriorate, making an un-uniform alignment. Further, problems incurred during the alignment layer rubbing process, such as dust particles, static electricity, contamination on rubbing cloth breakage, or rubbing scores, will lower yield rate of production.

U.S. Patent Publication No. 2004/0198182 discloses an apparatus for rubbing the alignment layer in an LCD substrate, as shown in FIG. 4. The apparatus comprises a platform 320, a conveyor 312, a base plate 310, a rubbing roller 302, and a conditioning roller 304. When a substrate 300, which has an alignment layer 301, is disposed on the base plate 310, the conveyor 312 will carry and move the base plate 310, together with the substrate 300 disposed on the base plate 310, along direction B, where the alignment layer 301 will be rubbed by the rubbing cloth 306 of a rubbing roller 302. The conditioning roller 304 is located at one side of the rubbing roller 302, such that when the rubbing roller 302 proceeds with a rubbing process, a conditioning cloth 308 of the conditioning roller 304 will contact and smoothen the rubbing cloth 306 of the rubbing roller 302. However, during the rubbing process, contamination from dust particles and rubbing or conditioning cloth breakage, or the problem of rubbing score, exists, resulting in an undesirable yield for the manufacturing process. Besides, since the apparatus for rubbing the alignment layer 301 is equipped with two rollers (i.e. the rubbing roller 302 and the conditioning roller 304), cost raise on manufacture of the apparatus becomes inevitable.

Therefore, during the rubbing process on the alignment layer, it becomes a critical issue as to how to maintain a smooth rubbing cloth on the rubbing roller so as to avoid contamination from dust particles and rubbing or conditioning cloth breakage or the problem of rubbing score, and eventually to lower the cost for manufacturing the apparatus for rubbing the alignment layers.

SUMMARY OF THE INVENTION

An object of the present invention is to provide an apparatus for rubbing the alignment on a substrate, with incorporation of a vacuum suction unit, dust particles produced during the mechanical rubbing process can be sucked and removed in real time so as to prevent rubbing scores occurred on the substrate due to interposing of the dust particles among fibers of the rubbing cloth of the rubbing rollers.

Another object of the present invention is to provide an apparatus for rubbing the alignment on a substrate, including a combing unit. The combing unit serves to comb fibers of the rubbing cloth in alignment, so that a desirable rubbing effect to the alignment layer on the substrate can be achieved, and that producing static electricity on the substrate can be avoided.

According to the present invention, the apparatus for rubbing an alignment layer on a substrate includes a platform to support the substrate; a conveyance unit incorporating the platform to convey the substrate in a predetermined direction; a rubbing roller located above the platform for rubbing the alignment layer on the substrate; a combing unit located at one side of the rubbing roller for contacting with the rubbing roller; and at least one vacuum suction unit located at one side of the platform to suck and remove the particles released from the rubbing.

According to the present invention, the substrate adapted to the alignment layer rubbing apparatus can be of any kinds for which a process of alignment layer rubbing is required. Preferably, the substrate has a surface formed with an alignment layer. The conveyance unit according to the present invention may be of any conventional, preferably plural rollers, so that likelihood of contamination on the substrate during conveyance can be reduced. Further, to assure a desirable alignment layer rubbing effect, the rubbing roller preferably has a rubbing cloth with fibers.

According to the present invention, one or more vacuum suction units, depending on requirement, are provided, where the vacuum suction unit may be arranged at a height not to be limited. Namely, the vacuum suction unit can be arranged at any end of the platform so as to suck and remove dust particles or fibers broken away from the rubbing cloth during the alignment layer rubbing process. Alternatively, the vacuum suction unit may be provided around the rubbing roller, where, preferably, the vacuum suction unit is disposed at a height greater than that of an axis of the rubbing roller, such that the fibers combed by the combing unit and broken away from the rubbing cloth can be sucked and removed in real time.

According to the present invention, rotational direction of the rubbing roller is not to be limited, which may be a direction the same as that the substrate is conveyed to, or a direction counter to which the substrate is conveyed. In such a manner, various alignment density and angle may be formed.

According to the present invention, the combing unit has a configuration or structure that may be a conventional element for purpose of combing, preferably a comb-like element for combing the fibers of the rubbing cloth during rotation of the rubbing roller. The combing unit may be disposed randomly at a location around the rubbing roller, preferably, at a location that combing to the rubbing cloth can be proceeded even though the rubbing roller is rotating; and most preferably, at a location that the distance between the combing unit and the platform is greater than that between the rubbing roller and the platform.

Other objects, advantages, and novel features of the present invention will become more apparent from the following detailed description when taken in conjunction with the accompanying drawings.

DETAILED DESCRIPTION OF THE PREFERRED EMBODIMENTS

Example 1

Figure 1:
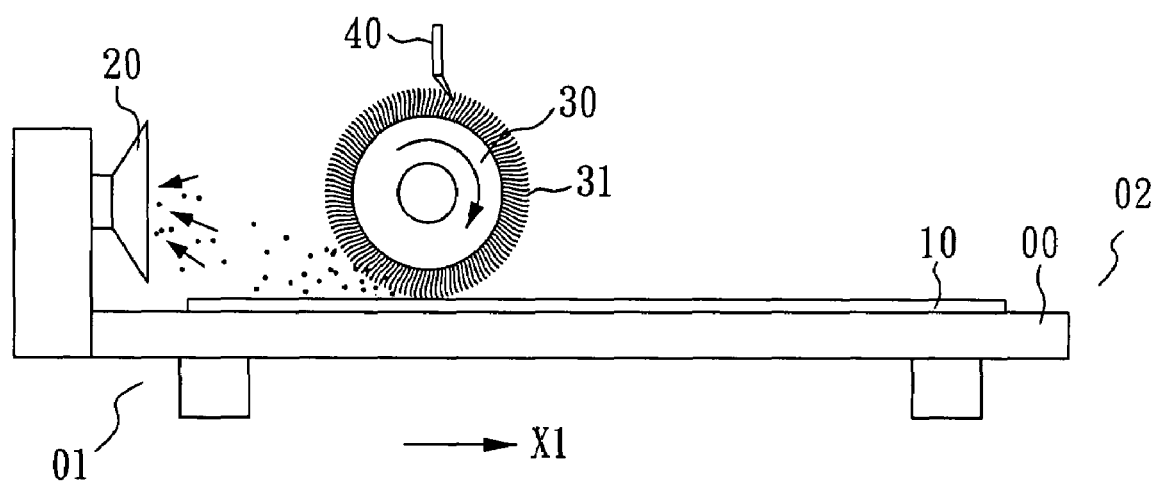
FIG. 1 is a schematic view showing an apparatus for rubbing the alignment layer on a substrate according to a first embodiment of the present invention.

Referring to FIG. 1, an apparatus for rubbing the alignment layer on a substrate according to a first embodiment of the present invention comprises a platform 00, a rubbing roller 30, and a vacuum suction unit 20.

On the platform 00 there is a substrate 10 subject to alignment layer rubbing, where an alignment layer (not shown) has been formed on the surface of the substrate 10. A conveyance unit (not shown) incorporating the platform 00 to convey the substrate 10 in a predetermined direction, where the conveyance unit may be of any conventional, preferably plural rollers, so that likelihood of contamination on the substrate 10 during conveyance can be reduced. The rubbing roller 30 is secured above the platform 00, so that when the substrate 10 moves over the rubbing roller 30, a rubbing cloth 31 on the rubbing roller 30 will proceed with a rolling rubbing against the alignment layer provided on the surface of the substrate 10 so as to form, on the alignment layer, a surface of plural regular micro-grooves.

The vacuum suction unit 20 is arranged at a front position 01 of the platform 00, acting as a vacuum cleaner. As shown in FIG. 1, when the substrate 10 moves forward along a direction indicated by arrow X1, the rubbing roller 30 rotates in a direction opposite to the direction that the substrate 10 moves, so that the particles produced and the fibers broken away from the rubbing cloth 31 due to the rubbing will be floating along the rotational direction of the rubbing roller 30 and toward the front position 01 of the platform 00. Accordingly, to arrange the vacuum suction unit 20 at the front position 01 can achieve an utmost suction effect.

During the process of alignment layer rubbing, the fibers of the rubbing cloth 31 on the rubbing roller 30 keep striking on the substrate 10. This, however, makes the fibers of the rubbing cloth 31 stretching toward irregular directions. Some time after the alignment layer rubbing process, the fibers of the rubbing cloth 31 will become twisted, resulting in irregular micro-grooves on the alignment layer of the substrate 10. This, of course, affects the outcome of the alignment layer rubbing. Therefore, in the present embodiment, a combing unit is provided such that the rubbing cloth 31 of the rubbing roller 30, even under rotation, can still be combed, so as to enhance the alignment layer rubbing effect. In addition, to comb and make neat the fibers of the rubbing cloth 31 will reduce occurrence of static electricity.

A combing unit of plural gaps (not shown), such as a combing plate 40, is arranged above the rubbing roller 30, and in a manner such that when the rubbing roller 30 is rotating and that the fibers of the rubbing cloth 31 on the rubbing roller 30 are stretching outward due to centrifugal force, the combing plate 40 can still contact with the fibers of the rubbing cloth 31 and thus a combing effect can be secured. Further, the size and spacing among the gaps on the combing plate 40 are adjusted according to the diameter and the density of the fibers of the rubbing cloth 31. In addition, the combing plate 40 according to the present embodiment adopts a material of anti-static electricity, such as metal, so as to reduce accumulation of static electricity on the rubbing cloth 31.

Example 2

Figure 2:
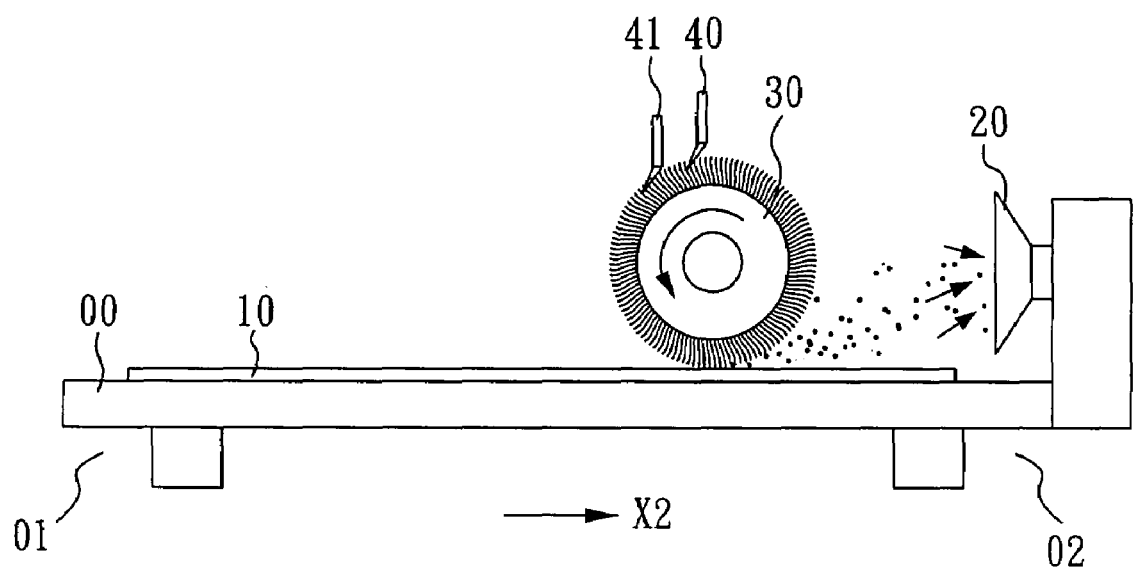
FIG. 2 is a schematic view showing an apparatus for rubbing the alignment layer on a substrate according to a second embodiment of the present invention.

In this particular embodiment, as shown in FIG. 2, the structure of an apparatus for rubbing the alignment layer on a substrate is substantially similar to that illustrated in FIG. 1, and thus reference numerals refer to similar elements in both embodiments. To the effect, in the present embodiment, a vacuum suction unit 20 and a rubbing roller 30 are located at positions different from those of the first embodiment shown in FIG. 1. According to the present embodiment, when a substrate 10 moves forward along a direction indicated by arrow X2, the rubbing roller 30 rotates in a direction the same as that the substrate 10 moves, so that the particles produced and the fibers broken away from a rubbing cloth due to the rubbing will be floating along the rotational direction of the rubbing roller 30 and toward the rear position 02 of a platform 00. Accordingly, to arrange the vacuum suction unit 20 at the rear position 02 can achieve an utmost suction effect.

Similarly, according to the present embodiment, in addition to a first combing plate 40, as arranged in the first embodiment, a second combing plate 41 is provided adjacent to the first combing plate 40. Under a combing effect of the double combing plates 40, 41, fibers of the rubbing cloth can be combed in a neater manner, enhancing yield on alignment layer rubbing.

Example 3

Figure 3:
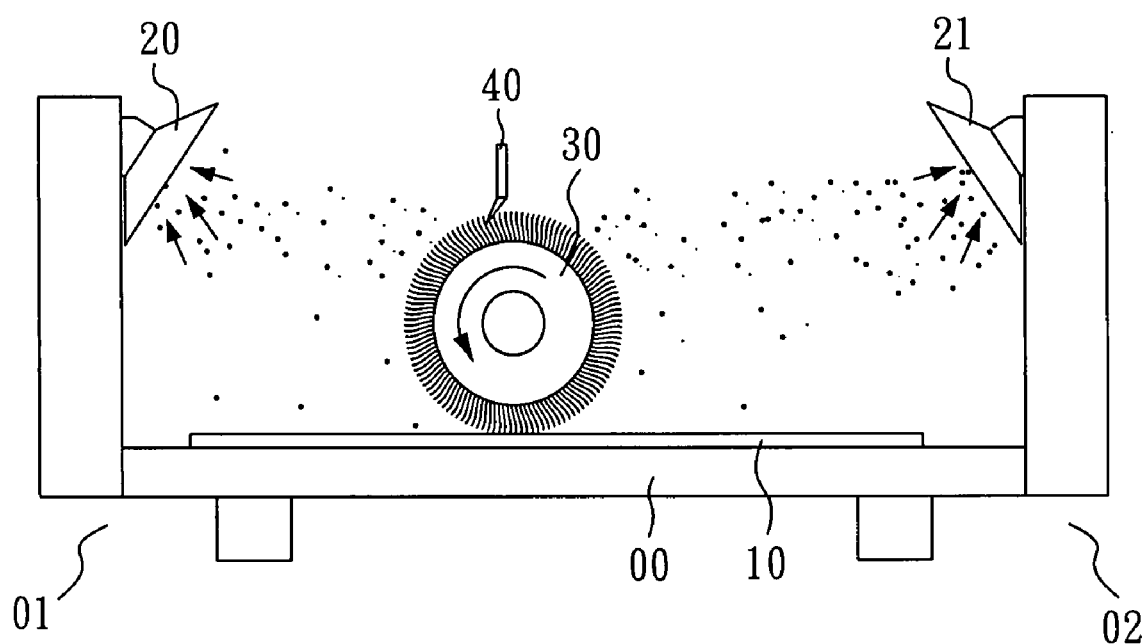
FIG. 3 is a schematic view showing an apparatus for rubbing the alignment layer on a substrate according to a third embodiment of the present invention.
Figure 4:
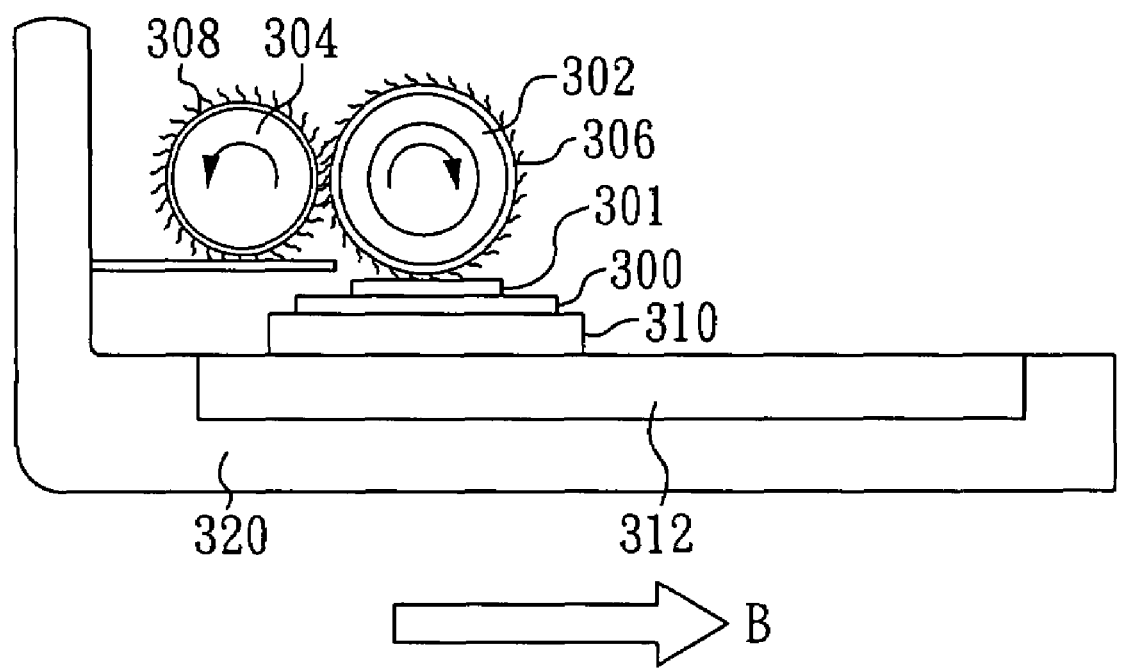
FIG. 4 is a schematic view showing a conventional apparatus for rubbing the alignment layer on a substrate.

In the present embodiment, as shown in FIG. 3, the structure of an apparatus for rubbing the alignment layer on a substrate is substantially similar to that illustrated in FIG. 1, and so reference numerals refer to similar elements. Namely, in the present embodiment, a vacuum suction unit 20 and a rubbing roller 30 are located at positions different from those of the first and second embodiments. According to the present embodiment, there are two vacuum suction units 20, 21 located, respectively, at a front position and a rear position of a platform 00, where the vacuum suction units 20, 21 are disposed at a height greater than that of an axis of the rubbing roller 30. Such an arrangement can make the fibers combed by a combing plate 40 and broken away from a rubbing cloth of the rubbing roller 30 be sucked and removed in real time, so that the chance for the fibers to fall on a substrate 10 is lessened and that yield of alignment layer rubbing is enhanced.

Through the help of the apparatus for rubbing the alignment layer on the substrate according to the present invention, the vacuum suction unit is employed to suction, in real time, the dust particles released during the mechanical rubbing process undertaken by the rubbing roller, so as to prevent the substrate from being left with rubbing scores, by the dust particles interposing among the fibers of the rubbing cloth. Further, the combing unit serves to comb the fibers of the rubbing cloth in alignment, and to reduce the likelihood of producing static electricity on the rubbing cloth, as well as dust particles attracted on the rubbing cloth due to the static electricity. This will result in a desirable alignment layer rubbing effect on the substrate.

Although the present invention has been explained in relation to its preferred embodiments, it is to be understood that many other possible modifications and variations can be made without departing from the scope of the invention as hereinafter claimed.

What is claimed is:

1. An apparatus for rubbing an alignment layer on a substrate, comprising:
    a platform for supporting the substrate;
    a conveyance unit incorporating the platform to convey the substrate in a predetermined direction;
    a rubbing roller located above the platform for rubbing the alignment layer on the substrate;
    a combing unit located at one side of the rubbing roller for contacting with the rubbing roller; and
    at least one vacuum suction unit located at one side of the platform to suck and remove particles released from the rubbing.

2. The apparatus of claim 1, wherein the conveyance unit comprises plural rollers.

3. The apparatus of claim 1, wherein the rubbing roller is provided with a rubbing cloth with fibers.

4. The apparatus of claim 1, wherein the at least one vacuum suction unit is disposed at a height greater than that of an axis of the rubbing roller.

5. The apparatus of claim 1, wherein the at least one vacuum suction unit is arranged at the platform.

6. The apparatus of claim 1, wherein rotational direction of the rubbing roller is the same as that to which the substrate is conveyed.

7. The apparatus of claim 1, wherein rotational direction of the rubbing roller is counter to that to which the substrate is conveyed.

8. The apparatus of claim 1, wherein the combing unit comprises a comb-like element.

9. The apparatus of claim 1, wherein a distance between the combing unit and the platform is greater than that between the rubbing roller and the platform.

10. The apparatus of claim 3, wherein the combing unit proceeds with combing the fibers of the rubbing cloth during rotation of the rubbing roller.

11. The apparatus of claim 1, wherein the combing unit is made of a material of anti-static electricity.

12. The apparatus of claim 11, wherein the material of anti-static electricity is metal.

* * * * *